United States Patent [19]
Chupp et al.

[11] 3,887,355
[45] June 3, 1975

[54] HERBICIDAL COMPOSITION AND METHODS EMPLOYING N-(1-ALKEN-1-YL)-AMINO-S-TRIAZINE COMPOUNDS

[75] Inventors: John P. Chupp, Kirkwood; Ching C. Tung, St. Louis, both of Mo.

[73] Assignee: Monsanto Company, St. Louis, Mo.

[22] Filed: June 17, 1974

[21] Appl. No.: 479,933

Related U.S. Application Data

[60] Continuation of Ser. No. 243,091, April 11, 1972, abandoned, which is a division of Ser. No. 103,881, Jan. 4, 1971, Pat. No. 3,784,544.

[52] U.S. Cl. .................................................. 71/93
[51] Int. Cl. .............................................. A01n 9/22
[58] Field of Search .................................. 71/93, 92

[56] References Cited
UNITED STATES PATENTS

| | | | |
|---|---|---|---|
| 2,891,855 | 6/1959 | Gysin et al. | 71/93 |
| 2,909,420 | 10/1959 | Gysin et al. | 71/93 |

Primary Examiner—James O. Thomas, Jr.
Attorney, Agent, or Firm—William T. Black

[57] ABSTRACT

Compounds of the formula

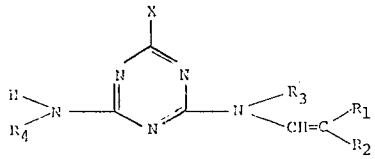

where X represents chloro or alkylthio of a maximum of 4 carbon atoms;

$R_1$ represents alkyl of a maximum of 2 carbon atoms;

$R_2$ represents alkyl of a maximum of 4 carbon atoms;

$R_3$ and $R_4$ each represent alkyl of a maximum of 4 carbon atoms.

These compounds have been found to be superior herbicides.

16 Claims, No Drawings

HERBICIDAL COMPOSITION AND METHODS EMPLOYING N-(1-ALKEN-1-YL)-AMINO-S-TRIAZINE COMPOUNDS

This is a continuation of application Ser. No. 243,091, filed Apr. 11, 1972, now abandoned, which is a division of application Ser. No. 103,881, filed Jan. 4, 1971, now U.S. Pat. No. 3,784,544.

This invention relates to new chemical compounds, to herbicidal compositions containing same and to the related method of controlling the growth of plants. To be more specific, in accordance with this invention it has been discovered that certain new N-(1-alken-1-yl)amino-s-triazines hereindescribed are exceptional herbicidally active compounds.

The present compounds, although being new, are isomers of known herbicidally active compounds described in U.S. Pat. Nos. 2,891,855 and 2,909,420, both issued to Hans Gysin. The s-triazine compounds thereindescribed are stated to possess herbicidal activity and in fact some, other than the alkenylamino compounds, have been found to possess very good herbicidal activity with desirable selectivity. Such s-triazines have achieved good commercial success even though they possess significant disadvantages such as low water solubility and residual or carryover effects when applied in the field. Although the foregoing patents broadly teach compounds with alkenylamino substituents on some of the nuclear carbons, invariably and without exception, the specific teachings are limited to such substituents wherein the double bond in the alkenyl moiety is in the 2 or higher position so as to be more removed from the alkenylamino moiety nitrogen. This is conveniently made clear by reference to the pictorial illustration of radicals in the table in column 2 of U.S. Pat. No. 2,891,855. The procedures or reactions described in these patents do not result in the formation of compounds having the double bond in the 1-position.

It has now been found that the presently claimed "1-ene" isomers of compounds similar to some of the compounds in the aforementioned patents have unexpected superior properties in comparison to their "2-ene" counterparts.

The new N-(1-alken-1-yl)amino-s-triazine compounds of this invention are of the formula

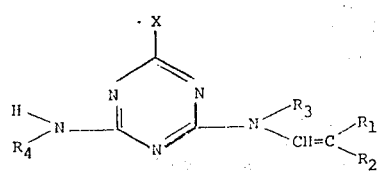

where X represents chloro or alkylthio of a maximum of 4 carbon atoms;
$R_1$ represents alkyl of a maximum of 2 carbon atoms;
$R_2$ represents alkyl of a maximum of 4 carbon atoms;
$R_3$ and $R_4$ each represent alkyl of a maximum of 4 carbon atoms.

Preferred N-(1-alken-1-yl)amino-s-triazines of the above formula are where $R_1$ and $R_2$ are each methyl and where X is methylthio. Preferably $R_3$ and $R_4$ are not both methyl radicals although they can be. The most preferred embodiment or compound of this invention is 2-ethyl-amino-4-[N-ethyl-N-(2-methyl-1-propen-1-yl)amino]-6-methylthio-s-triazine, particularly when applied to rice crops because of its great margin of safety without injury to the rice due to its highly selective activity. Most of these compounds, however, have good selectivity in regard to many agronomic crop plants.

Illustrative examples of compounds within the scope of this invention are:

2-methylamino-4-[N-propyl-N-(2-methyl-1-propen-1-yl)amino]-6-methylthio-s-triazine
2-methylamino-4-[N-ethyl-N-(2-methyl-1-propen-1-yl)amino]-6-methylthio-s-triazine
2-methylamino-4-[N-isopropyl-N-(2-methyl-1-propen-1-yl)amino]-6-methylthio-s-triazine
2-ethylamino-4-[N-methyl-N-(2-methyl-1-propen-1-yl)amino]-6-methylthio-s-triazine
2-ethylamino-4-[N-ethyl-N-(2-methyl-1-propen-1-yl)amino]-6-methylthio-s-triazine
2-ethylamino-4-[N-isopropyl-N-(2-methyl-1-propen-1-yl)amino]-6-methylthio-s-triazine
2-isopropylamino-4-[N-methyl-N-(2-methyl-1-propen-1-yl)amino]-6-methylthio-s-triazine
2-isopropylamino-4-[N-ethyl-N-(2-methyl-1-propen-1-yl)amino]-6-methylthio-s-triazine
2-isopropylamino-4-[N-isopropyl-N-(2-methyl-1-propen-1-yl)amino]-6-methylthio-s-triazine
2-butylamino-4-[N-ethyl-N-(2-methyl-1-propen-1-yl)amino]-6-methylthio-s-triazine
2-t-butylamino-4-[N-methyl-N-(2-methyl-1-propen-1-yl)amino]-6-methylthio-s-triazine
2-ethylamino-4-[N-sec-butyl-N-(2-methyl-1-propen-1yl)amino]-6-methylthio-s-triazine
2-ethylamino-4-[N-ethyl-N-(2-methyl-1-buten---yl)amino]-6-methylthio-s-triazine
2-ethylamino-4-[N-ethyl-N-(2-ethyl-1-buten-1-yl)amino]-6-methylthio-s-triazine
2-methylamino-4-[N-propyl-N-(2-methyl-1-propen-1-yl)amino]-6-chloro-s-triazine
2-methylamino-4-[N-ethyl-N-(2-methyl-1-propen-1yl)amino]-6-chloro-s-triazine
2-methylamino-4-[N-isopropyl-N-(2-methyl-1-propen-1-yl)amino]-6-chloro-s-triazine
2-ethylamino-4-[N-methyl-N-(2-methyl-1-propen-1-yl)amino]-6-chloro-s-triazine
2-ethylamino-4-[N-ethyl-N-(2-methyl-1-propen-1-yl)amino]-6-chloro-s-triazine
2-ethylamino-4-[N-isopropyl-N-(2-methyl-1-propen-1-yl)amino]-6-chloro-s-triazine
2-isopropylamino-4-[N-methyl-N-(2-methyl-1-propen-1-yl)amino]-6-chloro-s-triazine
2-isopropylamino-4-[N-ethyl-N-(2-methyl-1-propen-1-yl)amino]-6-chloro-s-triazine
2-isopropylamino-4-[N-isopropyl-N-(2-methyl-1-propen-1-yl)amino]-6-chloro-s-triazine
2-butylamino-4-[N-ethyl-N-(2-methyl-1-propen-1-yl)amino]-6-chloro-s-triazine
2-t-butylamino-4-[N-ethyl-N-(2-methyl-1-propen-1yl)amino]-6-chloro-s-triazine
2-ethylamino-4-[N-t-butyl-N-(2-methyl-1-propen-1-yl)amino]-6-chloro-s-triazine
2-ethylamino-4-[N-ethyl-N-(2-methyl-1-buten-1-yl)amino]-6-chloro-s-triazine
2-ethylamino-4-[N-ethyl-N-(2-ethyl-1-buten-1-yl)amino]-6-chloro-s-triazine The 1-ene compounds of this invention can be prepared by the following reaction sequence:

1. The reaction of cyanuric chloride and an N-alkyl-N-alkylidene amine to form a 2,6-dichloro-4-[N-alkyl-N-(1-alken-1-yl)amino]-s-triazine.

2. The above product is then reacted with an alkylamine corresponding to the desired alkylamino substituent to form the 2-alkylamino-4-[N-alkyl-N-(1-alken-1-yl)amino]-6-chloro-s-triazine.

3. The corresponding 6-methylthio-s-triazine from the 6-chloro-s-triazine (as described in (2) above) is prepared, if it is desired, by reacting the 6-chloro-s-triazine compound with an alkali metal salt of alkyl mercaptans, for example, $KSCH_3$. The first step in the foregoing sequence is novel in triazine chemistry, whereas the other two steps are well known in the art. Accordingly, the first step will be discussed with more particularity.

STEP 1.

The first step is to be carried out in a solvent which can be any dry inert organic solvent, but preferably the solvent is one of foregoing character which in addition is polar enough to dissolve the cyanuric chloride, such as dioxane.

Only substantially equi-molar amounts of N-alkyl-N-alkylidene amine and cyanuric chloride are required in this step to effect nearly quantitative yields of 2,6-dichloro-4-[N-alkyl-N-(1-alkenyl-1-yl)amino]-s-triazine. This reaction then, represents a unique departure from the usual replacement of one chlorine atom from cyanuric chloride with alkyl, 2- or higher than 2-alkenyl amines, wherein two moles of reactant amine or one mole of reactant amine and one mole of neutralizing base are necessary per mole of cyanuric chloride. In the ordinary reactions, one molecule of amine replaces the chlorine atom to immediately give hydrogen chloride which quickly unites with a second molecule of imine, rendering the latter inert toward reaction with cyanuric chloride; unless a mole of neutralizing base or second mole of reactant amine is employed.

The novelty of the reaction described in this step consists of all the imine adding to the cyanuric chloride, without release of hydrogen chloride. Moreover, the intermediate adduct is soluble in the solvent employed, so that homogeneous conditions and hence better heat transfer are maintained at all times. The desired 2,6-dichloro-4-[N-alkyl-N-(1-alkenyl-1-yl)amino]-s-triazine can easily be obtained by merely appropriate thermolysis of the adduct as described below.

Because reaction of only one chlorine of the cyanuric chloride molecule with one imine molecule is desired, initially a temperature below about 30°C and more preferably below about 25°C is employed in this step. However, a temperature below about −25° is usually not preferred. The most preferred initial temperature is in the range of about 0° to 10°C. To insure complete removal of HCl formed by the reaction after the reaction is initiated, a higher finishing temperature is preferably employed. The finishing temperature in the first step should be above about 35°C and a temperature in the range of about 60° – 110°C is preferred. The precise finishing temperature within this latter range usually is determined by the boiling point of the reaction solvent because refluxing the reaction mixture at atmospheric pressure is a highly satisfactory manner of carrying out the finishing step of HCl removal. Other pressures than atmospheric and means of removing HCl other than refluxing can, of course, be employed but such are generally less preferred to refluxing at atmospheric pressure.

STEP 2.

In this, slightly higher temperatures are to be employed than in step 1, however, the initial temperature of the second step should be kept below about 45°C in order to again limit reaction to only one of the two remaining chlorine atoms in the triazine ring of the product from step 1. Preferred temperatures are about 10° to 20°C. The solvent to be employed here has the same general characteristics as in step 1 but the triazine reactant is slightly more soluble and therefore the preferred group of solvents is larger and includes, for example, diethyl ether in addition to dioxane.

STEP 3.

This step is an optional step and is to be carried out only in cases wherein X is to be an alkylthio group in the structures claimed herein. This reaction can be carried out at still higher temperatures than step 2. Preferred temperatures for initiating this reaction are above room temperature and preferably are carried out at about 60° to 100°C.

The term "herbicide" as used herein and in the appended claims means materials which control the growth of plants either (1) all plants in a given locus or (2) selectively control the growth of one or more plant species in the presence of other plants. In like manner, "herbicidal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation or composition" as used herein means a N-(1-alken-1-yl)amino-s-triazine of this invention in combination with one or more adjuvants to be defined hereinbelow.

The compounds will now be exemplified as to both preparation and use in a herbicidal capacity.

EXAMPLE 1

About 40 g. (0.217 mol.) of cyanuric chloride and about 200 ml. of dioxane were placed in a 500 ml. 4-necked flask equipped with a thermometer, dropping funnel, stirrer and a condenser using tap water as cooling medium. The foregoing mixture was cooled to 0° to 5°C and about 19.3 g. (0.217 mol.) of N-ethyl-N-isobutylideneamine was added dropwise with good stirring. After the imine addition was complete, the mixture was heated and refluxed for 3 hours, then allowed to cool. Dioxane was stripped off to a temperature of about 80°C at 0.5 mm/Hg. The residue was taken up in pentane and was eluted with pentane through a Florisil packed column. The pentane was then stripped off at high vacuum.

About 12 g. (0.0485 mol.) of the 2,4-dichloro-6-[N-ethyl-N(2-methyl-1-propen-1yl)amino]-s-triazine prepared above was dissolved in ether and was charged to a 4-necked flask equipped as above and cooled to 10° to 15°C with an ice-water bath. About 4.35 g. (0.097 mol.) of ethylamine was added dropwise with good stirring. The temperature was raised to reflux and the mixture was refluxed for about 45 minutes, then allowed to stand overnight. The ether solution was filtered and washed with water and dried over $MgSO_4$. The $MgSO_4$ was removed by filtering and the ether stripped off. An oily residue, which gradually solidified, was recrystallized from pentane. The product was identified by elemental analysis and by nuclear magnetic resonance spectral analysis as 2-chloro-4-ethylamino-6-[N-ethyl-N-(2-methyl-1-propen-1-yl)amino]-s-triazine.

EXAMPLE 2

About 2.5 g. (0.0098 mol.) of the foregoing product of Example 1 was charged into a 250 ml. round bottom flask equipped with a reflux condenser and sparging tube and was dissolved in tert.butanol. To this was added at room temperature a tert.butanol solution containing about 1.45 g. (0.013 mol.) of $KOC(CH_3)_3$ which had been sparged with an excess of $CH_3SH$. The reaction mixture was then refluxed for 3 hours. The solvent was stripped and the residue was taken up in ether, washed three times with water and dried over $MgSO_4$. The $MgSO_4$ was filtered off and the solvent stripped off leaving a residue which solidified. The residue was recrystallized from pentane cooled in a dry-ice and acetone bath. The white solid product recovered had the following elemental analysis:

|   | Calculated | Found |
|---|---|---|
| C | 53.90 | 53.83 |
| H | 7.92 | 7.93 |
| N | 26.19 | 26.04 |

The product was determined by nuclear magnetic resonance spectral analysis to be 2-(ethylamino)-4-[N-ethyl-N-(2-methyl-1-propen-1-yl)amino]-6-methylthio-s-triazine.

EXAMPLE 3

Following the procedures described in Examples 1 and 2, the following N-(1-alken-1-yl)amino-s-triazine compounds were prepared:

2-methylamino-4-[N-ethyl-N-(2-methyl-1-propen-1-yl)amino]-6-methylthio-s-triazine
2-isopropylamino-4-[N-methyl-N-(2-methyl-1-propen-1-yl)amino]-6-methylthio-s-triazine
2-isopropylamino-4-[N-ethyl-N-(2-methyl-1-propen-1-yl)amino]-6-methylthio-s-triazine
2-chloro-4-[N-isopropyl-N-(2-methyl-1-propen-1-yl)amino]-6-methylamino-s-triazine
2-chloro-4-(isopropylamino)-6-[N-ethyl-N-(2-methyl-1-propen-1yl)amino]-s-triazine
2-tert.-butylamino-4-[N-methyl-N-(2-methyl-1-propen-1-yl)amino]-6-methylthio-s-triazine
2-chloro-4-tert.-butylamino-6-[N-methyl-N-(2-methyl-1-propen-1-yl)amino]-s-triazine
2-isopropylamino-4-[N-isopropyl-N-(2-methyl-1-propen-1-yl)amino]-6-methylthio-s-triazine
2-chloro-4-isopropylamino-6-[N-isopropyl-N-(2-methyl-1-propen-1-yl)amino]-s-triazine
2-chloro-4-methylamino-6-[N-ethyl-N-(2-methyl-1-propen-1-yl)amino]-s-triazine
2-methylamino-4-[N-isopropyl-N-(2-methyl-1-propen-1-yl)amino]-6-methylthio-s-triazine
2-ethylamino-4-[N-methyl-N-(2-methyl-1-propen-1-yl)amino]-methylthio-s-triazine

EXAMPLE 4

The pre-emergent herbicidal activity of the active ingredients of this invention is demonstrated by the incorporation method as follows: A good grade of top soil is placed in aluminum pans and compacted to a depth of ⅜ to ½ inch from the top of each pan. A predetermined number of seeds or plant propagules of the test plant species are placed on top of the soil in the pans. The seeds and propagules are covered with a ⅜ inch layer of soil which has been premixed with a herbicidal formulation containing a sufficient amount of active ingredient to obtain the desired rate of active ingredient per acre, and the pan leveled.

The seed-containing pans are placed on a sand bench and maintained under ordinary conditions of sunlight and watering. The plants are observed at the end of approximately 14 days and the results recorded. The herbicidal activity index is based on the average percent control of each seed lot. The herbicidal activity index is converted to a relative numerical scale for the sake of brevity and simplicity in the table.

The pre-emergent herbicidal activity index used is defined as follows:

| Average Percent Control | Numerical Scale |
|---|---|
| 0 to 25 | 0 |
| 26 to 50 | 1 |
| 51 to 75 | 2 |
| 76 to 100 | 3 |

In Table I, below, the dosage rate, the spectrum of plant seeds treated, and the results of tests carried out according to the above procedure are indicated for several of the compounds of this invention.

TABLE I

| Compound | Rate Lb/Acre | Soybean | Sugar Beet | Wheat | Rice | Sorghum | Cocklebur | Wild Buckwheat | Morning Glory | Hemp Sesbania | Lambsquarter | Smartweed | Velvet Leaf | Downy Brome | Panicum | Barnyard Grass | Crab Grass |
|---|---|---|---|---|---|---|---|---|---|---|---|---|---|---|---|---|---|
| A | 1 | 0 | 3 | 0 | 0 | 0 | 0 | 1 | 2 | 1 | 3 | — | 0 | 0 | 3 | 3 | 2 |
| A | 0.25 | 0 | 3 | 0 | 0 | 0 | 0 | 0 | 3 | 3 | 0 | 0 | 0 | 1 | 2 | 3 |
| B | 1 | 0 | 3 | 0 | 1 | 1 | 0 | 2 | 0 | 2 | 3 | — | 0 | 0 | 2 | 1 | 2 |
| C | 1 | 0 | 3 | 0 | 0 | 0 | 0 | 1 | 3 | 3 | 2 | — | 0 | 1 | 3 | 3 | 1 |
| D | 1 | 0 | 3 | 0 | 0 | 0 | 0 | 2 | 0 | 2 | 3 | 2 | 1 | 0 | 1 | 2 | 2 |

TABLE 1 –Continued

| Compound | Rate Lb/ Acre | Soybean | Sugar Beet | Wheat | Rice | Sorghum | Cocklebur | Wild Buckwheat | Morning Glory | Hemp Sesbania | Lambsquarter | Smartweed | Velvet Leaf | Downy Brome | Panicum | Barnyard Grass | Crab Grass |
|---|---|---|---|---|---|---|---|---|---|---|---|---|---|---|---|---|---|
| E | 1 | 1 | 2 | 0 | 0 | 1 | — | 1 | 0 | 2 | — | 2 | 2 | 1 | 0 | 0 | 2 |
| F | 1 | 1 | 2 | 0 | 0 | 1 | 0 | 2 | 3 | 2 | 2 | — | 1 | 2 | 1 | 2 | 1 |
| G | 1 | 0 | 3 | 0 | 0 | 0 | 0 | 3 | 1 | 1 | 3 | 3 | 1 | 1 | — | 1 | 1 |
| H | 1 | 0 | 3 | 0 | 0 | 0 | 0 | 0 | 0 | 3 | 2 | 3 | 0 | 0 | 3 | 3 | 3 |

A  2-ethylamino-4-[N-ethyl-N-(2-methyl-1-propen-1-yl)amino]-6-methylthio-s-triazine
B  2-methylamino-4-[N-ethyl-N-(2-methyl-1-propen-1-yl)amino]-6-methylthio-s-triazine
C  2-isopropylamino-4-[N-methyl-N-(2-methyl-1-propen-1-yl)-amino]-6-methylthio-s-triazine
D  2-isopropylamino-4-[N-ethyl-N-(2-methyl-1-propen-1-yl)-amino]-6-methylthio-s-triazine
E  2-chloro-4-ethylamino-6-[N-ethyl-N-(2-methyl-1-propen-1-yl)amino]-s-triazine
F  2-chloro-4-[N-isopropyl-N-(2-methyl-1-propen-1-yl)amino]-6-methylamino-s-triazine
G  2-chloro-4-(isopropylamino)-6-[N-ethyl-N-(2-methyl-1-propen-1-yl)amino]-s-triazine
H  2-tert.-butylamino-4-[N-methyl-N-(2-methyl-1-propen-1-yl)amino]-6-methylthio-s-triazine

EXAMPLE 5

In a post-emergent herbicidal test, the active ingredients in each case are applied in spray form to 14 or 21-day—old specimens of the plants (species indicated hereinafter). The herbicidal sprays are acetone-water solutions containing surface active agent and varying amounts of the active ingredient. The solutions are applied to the plants in different pans at the indicated concentrations of active ingredient. The treated plants are placed in a greenhouse and the effects are observed and recorded after approximately 14 days.

The post-emergent herbicidal activity index used in this example is defined as follows:

| Numerical Scale | Herbicidal Activity |
|---|---|
| 0 | No phytotoxicity |
| 1 | Slight phytotoxicity |
| 2 | Moderate phytotoxicity |
| 3 | Severe phytotoxicity |
| 4 | Plants dead |

In Table II the dosage rate, the spectrum of plants treated, the age of the plants, and the results carried out according to the above procedure are indicated for illustrative compounds of this invention.

TABLE II

| Compound | Concentration | Soybean | Sugar Beet | Wheat | Rice | Sorghum | Cocklebur | Wild Buckwheat | Morning Glory | Hemp Sesbania | Lambsquarter | Smartweed | Velvet Leaf | Downy Brome | Panicum | Barnyard | Crab Grass | Age of Plants in Weeks |
|---|---|---|---|---|---|---|---|---|---|---|---|---|---|---|---|---|---|---|
| A | 0.05 | 3 | 4 | 1 | 1 | 3 | 4 | 3 | 3 | 3 | 3 | — | 0 | 2 | 3 | 3 | 3 | 3 |
| B | 0.05 | 2 | 2 | 0 | 1 | 3 | 3 | 2 | 1 | 3 | 2 | 1 | 0 | 0 | 3 | 1 | 0 | 3 |
| C | 0.05 | 4 | 4 | 2 | 3 | 4 | 4 | 4 | 4 | 4 | 3 | 3 | 1 | 3 | 4 | 4 | 3 | 3 |
| C | 0.01 | 3 | 4 | 1 | 2 | 2 | 1 | 3 | 4 | 4 | 3 | — | 0 | 2 | 4 | 2 | 3 | 3 |
| D | 0.05 | 4 | 4 | 2 | 3 | 3 | 4 | 4 | 4 | — | 4 | 1 | 2 | 4 | 4 | 4 | 2 |
| E | 0.05 | 1 | 2 | 0 | 2 | 0 | 1 | 2 | 1 | 3 | 2 | 3 | 0 | 0 | 1 | 1 | 2 |
| F | 0.05 | 0 | 4 | 0 | 0 | 0 | 1 | 3 | 1 | 1 | 4 | 1 | 0 | 0 | 0 | 0 | 2 |
| G | 0.05 | 3 | 4 | 2 | 3 | 1 | 4 | — | 3 | 3 | 4 | 4 | 2 | 1 | — | 2 | 4 | 2 |
| H | 0.05 | 4 | 4 | 1 | 2 | 0 | 4 | 4 | 0 | 4 | 4 | 4 | 3 | 4 | 4 | 4 | 2 |
| I | 0.05 | 1 | 4 | 0 | 0 | 0 | 1 | 2 | 1 | 3 | 3 | 0 | 0 | 0 | 1 | 0 | 2 |

A  2-ethylamino-4-[N-ethyl-N-(2-methyl-1-propen-1-yl)amino]-6-methylthio-s-triazine B  2-(methylamino)-4-[N-ethyl-N-(2-methyl-1-propen-1-yl)-amino]-6-methylthio-s-triazine C  2-isopropylamino-4-[N-methyl-N-(2-methyl-1-propen-1-yl)-amino]-6-methylthio-s-triazine D  2-isopropylamino-4-[N-ethyl-N-(2-methyl-1-propen-1-yl)-amino]-6-methylthio-s-triazine E  2-chloro-4-ethylamino-6-[N-ethyl-N-(2-methyl-1-propen-1-yl)-amino]-s-triazine F  2-chloro-4-[N-isopropyl-N-(2-methyl-1-propen-1-yl)amino]-6-methylamino-s-triazine G  2-chloro-4-isopropylamino-6-[N-ethyl-N-(2-methyl-1-propen-1-yl)amino]-s-triazine H  2-tert.-butylamino-4-[N-methyl-N-(2-methyl-1-propen-1-yl)-amino]-6-methylthio-s-triazine I  2-chloro-4-tert.-butylamino-6-[N-methyl-N-(2-methyl-1-propen-1-yl)amino]-s-triazine

EXAMPLE 6

In order to show the unexpected superiority of the presently claimed 1-ene triazines over the prior art 2-ene triazine isomers, comparative pre-emergent data are set forth below in Table III and post-emergent data set forth in Table IV. The procedure employed was the same as in Examples 2 and 3, respectively.

herbicidal formulations usually contain from about 0.01 to about 99 percent by weight of active ingredient.

Typical finely divided solid carriers and inert solid extenders which can be used with the active ingredients include for example, the talcs, natural and synthetic clays (e.g. kaolinites and attapulgite), pumice, silica, synthetic calcium and magnesium silicates, diatomaceous earth, quartz, Fuller's earth, salt, sulfur, pow-

TABLE III

| Compound | Rate Lb/Acre | Soybean | Sugar Beet | Wheat | Rice | Sorghum | Cocklebur | Wild Buckwheat | Morning Glory | Hemp Sesbania | Lambsquarter | Smartweed | Velvet Leaf | Downy Brome | Panicum | Barnyard Grass | Crab Grass |
|---|---|---|---|---|---|---|---|---|---|---|---|---|---|---|---|---|---|
| A | 1 | 0 | 3 | 0 | 0 | 0 | 0 | 1 | 2 | 1 | 3 | — | 0 | 0 | 3 | 3 | 2 |
| W | 1 | 0 | 1 | 0 | 0 | 0 | 0 | 0 | 0 | 0 | 3 | 1 | 0 | 0 | 0 | 1 | 0 |
| E | 1 | 1 | 2 | 0 | 0 | 1 | — | 1 | 0 | 2 | — | 2 | 2 | 1 | 0 | 0 | 2 |
| Z | 1 | 0 | 2 | 0 | 0 | 0 | 0 | 0 | 0 | 0 | 3 | 1 | 0 | 0 | 1 | 1 | 1 |

A   2-ethylamino-4-[N-ethyl-N-(2-methyl-1-propen-1-yl)amino]-6-methylthio-s-triazine
W   2-[N-ethyl-N-(2-methyl-2-propen-1-yl)amino]-4-ethylamino-6-methylthio-s-triazine
E   2-chloro-4-ethylamino-6-[N-ethyl-N-(2-methyl-1-propen-1-yl)amino]-s-triazine
Z   2-[N-ethyl-N-(2-methyl-2-propen-1-yl)amino]-4-ethylamino-6-chloro-s-triazine

TABLE IV

| Compound | Concentration Percent | Soybean | Sugar Beet | Wheat | Rice | Sorghum | Cocklebur | Wild Buckwheat | Morning Glory | Hemp Sesbania | Lambsquarter | Smartweed | Velvet Leaf | Downy Brome | Panicum | Barnyard Grass | Crab Grass | Age of Plants in Weeks |
|---|---|---|---|---|---|---|---|---|---|---|---|---|---|---|---|---|---|---|
| A | 0.05 | 3 | 4 | 1 | 1 | 3 | 4 | 3 | 3 | 3 | 3 | — | 0 | 2 | 3 | 3 | 3 | 3 |
| W | 0.05 | 1 | 4 | 0 | 0 | 0 | 0 | 0 | 3 | 2 | 4 | 2 | 0 | 1 | 3 | 3 | 3 | 2 |
| E | 0.05 | 1 | 2 | 0 | 2 | 0 | 1 | 2 | 1 | 3 | 2 | 3 | 0 | 0 | 1 | 1 | 3 |
| Z | 0.05 | 0 | 0 | 0 | 0 | 0 | 0 | 0 | 0 | 0 | 3 | 1 | 0 | 0 | 0 | 0 | 2 | 2 |

A   2-ethylamino-4-[N-ethyl-N-(2-methyl-1-propen-1-yl)amino]-6-methylthio-s-triazine
W   2-[N-ethyl-N-(2-methyl-2-propen-1-yl)amino]-4-ethylamino-6-methylthio)-s-triazine
E   2-chloro-4-ethylamino-6-[N-ethyl-N-(2-methyl-1-propen-1-yl)-amino]-s-triazine
Z   2-[N-ethyl-N-(2-methyl-2-propen-1-yl)amino]-4-ethylamino-6-chloro-s-triazine The foregoing comparative data clearly shows the claimed 1-ene triazines represented by compounds A and E are clearly superior in activity to the 2-ene triazines represented by W and Z.

For the sake of brevity and simplicity, the term "active ingredient" is used hereinafter in this specification to describe the N-(1-alken-1-yl)amino-s-triazine compositions of this invention.

In practicing the herbicidal methods of this invention, the active ingredients can be used alone or in combination with a material referred to in the art as an adjuvant in liquid or solid form. Herbicidal formulations are prepared by admixing the active ingredient with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The dered cork, powdered wood, ground corn cobs, walnut flour, chalk, tobacco dust, charcoal, volcanic ash, cottonseed hulls, wheat flour, soybean flour, tripoli and the like. Typical liquid diluents include for example; petroleum fractions such as kerosene, hexane, xylene, benzene, Diesel oil, toluene, acetone, ethylene dichloride, Stoddard solvent, alcohols such as propanol, glycols and the like.

Herbicidal formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

Specific surface-active agents which can be used in the herbicidal formulations of this invention are set out, for example, in Searle U.S. Pat. Nos. 2,426,417, Todd 2,655,447, Jones 2,412,510 and Lenher 2,139,276. A detailed list of such agents is also set forth Up J.W.

McCutcheon in "Soap and Chemical Specialties," November, 1947, page 8,011 et seq., entitled "Synthetic Detergents;" "Detergents and Emulsifiers —8 to Date" (1960), by J.W. McCutcheon, Inc., and Bulletin E-607 of the Bureau of Entomology and Plant Quarantine of the U.S.D.A. In general, less than 50 parts by weight of the surface active agent is present per 100 parts by weight of phytotoxic formulation.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenyl) and polyoxyethylene derivatives of the mono-higher fatty esters of hexitol anhydrides (e.g. sobitan). Preferred dispersents are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powder formulations usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. Where required, from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely divided particles. The resulting concentrated aqueous suspension is characterized by its extremely small particle size, so that when diluted and sprayed coverage is very uniform.

Dusts are dense finely divided particulate formulations which are intended for application to the soil in dry form. Dusts are characterized by their free-flowing and rapid settling properties so that they are not readily wind-borne to areas where they are of no value. Dusts contain primarily an active ingredient and a dense, free-flowing finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely divided solid extender for the dusts can be either of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and phyllite, dense koalin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oil formulations are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil formulations generally contain from about 5 to 95 parts active ingredient, about 1 to 50 parts surface active agent and about 4 to 94 parts solvent, all parts being by weight based on the total weight of the emulsifiable oil.

Granules are physically stable particulate formulations comprising active ingredient adhering to or distributed through a basic matrix of an inert, finely divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely divided clays such as Kaolin clays, hydrated attapulgite or bentonitic clays. These extenders are sprayed or blended with the active ingredient to form the herbicidal formulations.

The mineral particles which are used in the hericidal formulations usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the herbicidal formulations. The term "mesh" as used herein means U.S. Sieve Series.

The granular herbicidal formulations generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

The herbicidal formulations can also contain other additaments, for example fertilizers, plant growth regulants, pesticides and the like used as adjuvant or in combination with any of the above-described adjuvants.

When operating in accordance with the present invention, effective amounts of the active ingredients are dispersed in or on soil or plant growth media and/or applied to above ground portions of plants in any convenient fashion. Application to the soil or growth media can be carried out by simply mixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. powder dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The application of an effective amount of the active ingredients of this invention to the soil or growth media and/or plant is very important for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment for the modification of vegetative growth, the active ingredients are applied in amounts from about 0.1 to about 25 or more pounds per acre. In applications to soil for the modification of the growth of germinant seeds, germinative seeds, emerging seedlings and established vegetation, the active ingredients are applied in amounts from about 1 to about 50 or more pounds per acre. In such soil applications, it is desirable that the active ingredients be distributed to a depth of at least 0.2 inches. In selective pre-emergence herbicidal applications, the active ingredients are usually applied in amounts from about 0.1 to 25 pounds per acre, but preferably from about 0.1 to 10 pounds per acre. It is believed that one skilled in the art can readily determine from the teachings of this specification, including examples, the general procedure for any application.

In summary, in general the active ingredients may be formulated with the active ingredient in minor or major proportions in accordance with the table below:

| Type of Formulation | Concentration of Active Ingredient |
| --- | --- |
| 1. Granules of relatively large particle size | 5 to 50% |
| 2. Powdery dusts | 2 to 90% |
| 3. Wettable powders | 2 to 90% |
| 4. Emulsifiable concentrates | 5 to 95% |
| 5. Solutions | .01 to 95% |
| 6. One of the less common types of formulations depending on the desired mode of application | .01 to 95% |

Having now described the invention, many ramifications and modified embodiments will readily occur to those skilled in the art. In so far as such variations do not depart from the spirit and scope of the invention described in this application, they are intended to be embraced by the appended claims in their broadest construction.

What is claimed is:

1. Herbicidal method which comprises applying a herbicidal amount of a composition comprising at least one herbicidal adjuvant and at least one compound of the formula

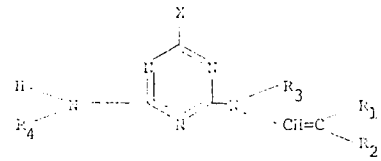

where X represents chloro or alkylthio of a maximum of 4 carbon atoms;
$R_1$ represents alkyl of a maximum of 2 carbon atoms;
$R_2$ represents alkyl of a maximum of 4 carbon atoms;
$R_3$ and $R_4$ each represents alkyl of a maximum of 4 carbon atoms.

2. Herbicidal method according to claim 1 wherein X is methylthio.

3. Herbicidal method according to claim 1 wherein X is chlorine.

4. Herbicidal method according to claim 2 wherein $R_1$ and $R_2$ are each methyl.

5. Herbicidal method according to claim 2 wherein at least one of $R_3$ and $R_4$ is other than methyl.

6. Herbicidal method according to claim 1 which is 2-ethylamino-4-[N-ethyl-N-(2-methyl-1-propen-1-yl)amino]-6-methylthio-s-triazine.

7. Herbicidal method according to claim 1 which is 2-tert.-butylamino-4-[N-methyl-N-(2-methyl-1-propen-1-yl)amino]-6-methylthio-s-triazine.

8. Herbicidal composition comprising at least one adjuvant and a herbicidally effective amount of at least one compound of the formula

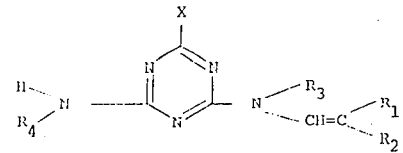

where X represents chloro or alkylthio of a maximum of 4 carbon atoms;
$R_1$ represents alkyl of a maximum of 2 carbon atoms;
$R_2$ represents alkyl of a maximum of 4 carbon atoms;
$R_3$ and $R_4$ each represent alkyl of a maximum of 4 carbon atoms.

9. Composition according to claim 8 wherein X is thiomethyl.

10. Composition according to claim 8 wherein X is chlorine.

11. Composition according to claim 9 wherein $R_1$ and $R_2$ are each methyl.

12. Composition according to claim 9 wherein at least one of $R_3$ and $R_4$ is other than methyl.

13. Composition according to claim 8 which is 2-ethyl-amino-4-[N-ethyl-N-(2-methyl-1-propen-1-yl)amino]-6-methylthio-s-triazine.

14. Composition according to claim 8 which is 2-tert.-butylamino-4-[-N-methyl-N-(2-methyl-1-propen-1-yl)amino]-6-methylthio-s-triazine.

15. Herbicidal method according to claim 1 wherein the composition is applied to the plants.

16. Herbicidal method according to claim 1 wherein the composition is applied to the growth media.

* * * * *